Sept. 18, 1956  A. W. LOHRMAN ET AL  2,763,767
ADJUSTABLE THERMOSTAT FOR AUTOMATIC ELECTRIC
COFFEE MAKER OR THE LIKE
Filed April 23, 1954  2 Sheets-Sheet 1
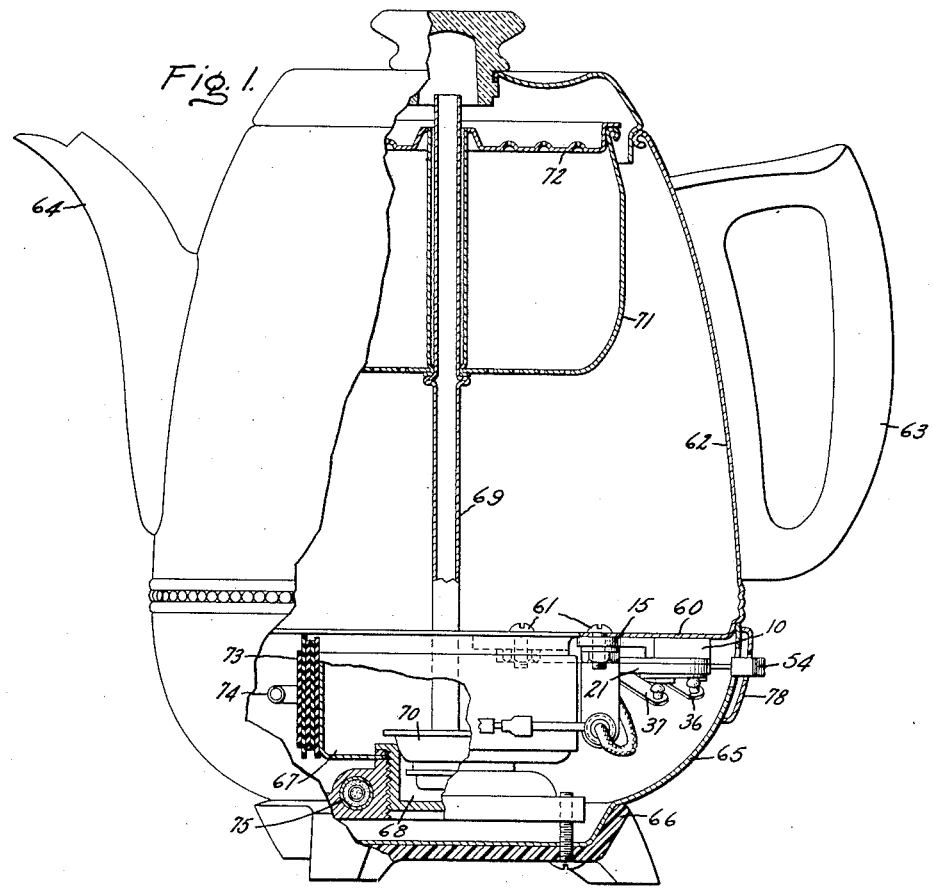
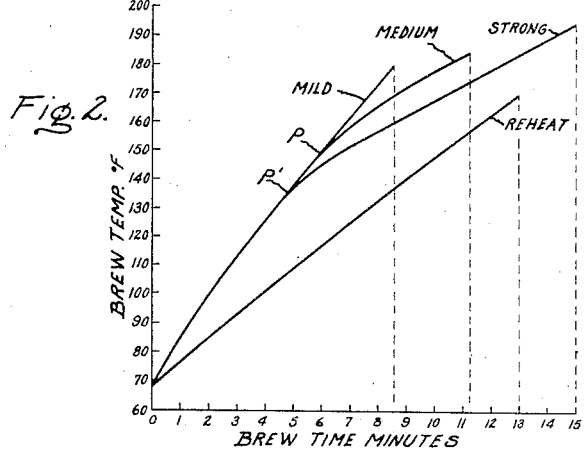
Inventors:
Albert W. Lohrman,
Paul M. Kropp Jr.,
by Frank L. Neuhauser
Their Attorney.

Sept. 18, 1956  A. W. LOHRMAN ET AL  2,763,767
ADJUSTABLE THERMOSTAT FOR AUTOMATIC ELECTRIC
COFFEE MAKER OR THE LIKE
Filed April 23, 1954  2 Sheets-Sheet 2
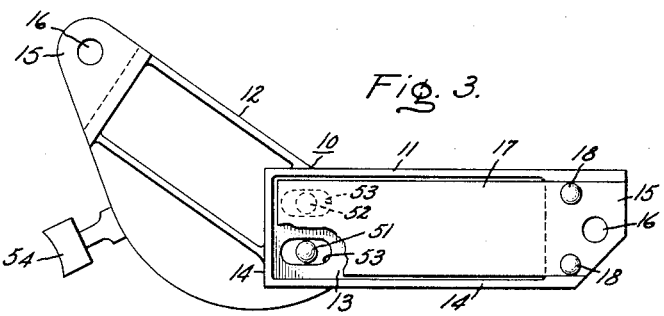
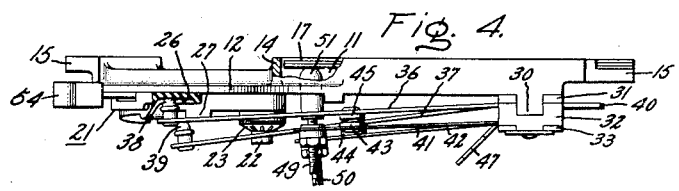
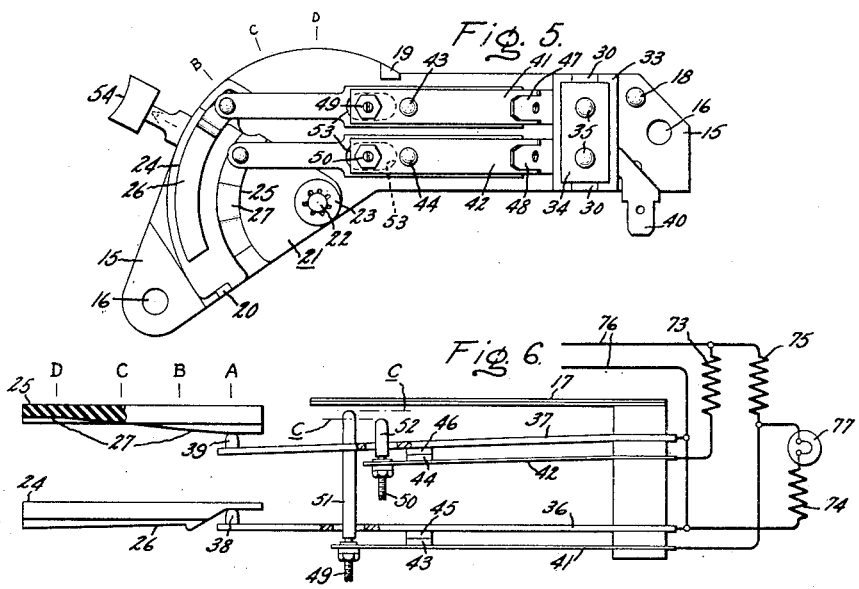
Inventors:
Albert W. Lohrman,
Paul M. Kropp Jr.,
by Frank L. Neuhauser
Their Attorney.

United States Patent Office 2,763,767
Patented Sept. 18, 1956

2,763,767

ADJUSTABLE THERMOSTAT FOR AUTOMATIC ELECTRIC COFFEE MAKER OR THE LIKE

Albert W. Lohrman, Allentown, and Paul M. Kropp, Jr., Bethlehem, Pa., assignors to General Electric Company, a corporation of New York Application April 23, 1954, Serial No. 425,160

9 Claims. (Cl. 219—44)

The present invention relates to adjustable thermostats. It is especially well adapted for use with automatic electric coffee makers having two or more heating units the circuits for which are to be separately controlled and it is this application of the invention which we have elected to specifically illustrate and describe. However, it is to be understood that the invention is not limited thereto necessarily but may be used in connection with other forms of electric heating or cooking devices.

The object of the invention is to provide an improved adjustable thermostat for controlling two or more heating circuits which is a compact unitary structure adapted to be attached as a unit to a wall of a coffee maker or the like, and which is simple in structure, reliable in operation, and capable of being manufactured at low cost.

For a consideration of what we believe to be novel and our invention, attention is directed to the following specification and to the claims appended thereto.

According to one form of the invention the thermostat comprises a base having walls which form a housing in which a bimetal is located, there being provided on the underside of the housing two sets of spring blades, each set having a pair of contacts, one set for controlling a heating unit such as a preheat unit for a coffee percolator or the like and the other for controlling a second heating unit such as a pump unit for a coffee percolator, there being pivoted on the base a cam plate having two cams, one for adjusting the position of one set of spring blades with respect to the bimetal and the other for adjusting the other set of spring blades with respect to the bimetal whereby the two sets of blades may be simultaneously adjusted in a desired manner with respect to the bimetal and with respect to each other.

In the drawing, Fig. 1 is a side elevation, partly in section, of an automatic electric coffee maker embodying the invention;

Fig. 2 is a graph illustrating the operation of the invention;

Fig. 3 is a top plan view partly broken away of the thermostat;

Fig. 4 is a side view, partly broken away, of the structure shown in Fig. 3;

Fig. 5 is a bottom plan view of the structure shown in Fig. 3;

Fig. 6 is a diagram;

Fig. 7 is a perspective view of the thermostat adjusting cam plate.

Referring first to Figs. 3, 4, 5 and 7, the thermostat comprises a base 10 shaped to provide a housing 11 and a bracket 12. Housing 11 has a bottom wall 13 and side and end walls 14 but is open at its top. It is rectangular in outline. Bracket 12 projects from one end of housing 11. At opposite ends of base 10 are ears 15 having openings 16 for the reception of fastening means for attaching the base to a receptacle wall. Extending across the open side of housing 11 and attached to the base at the end of the housing remote from bracket 12 is a bimetal 17 fastened in place by rivets 18. The underside of bracket 12 is a smooth flat surface having stop shoulders 19 and 20 at its two extremities between which is pivotally mounted a triangular shaped cam plate 21, the cam plate being pivoted at its apex on a pivot pin 22 on bracket 12 and being held thereon by a suitable fastener 23. Cam plate 21 has two concentric cams 24 and 25 thereon which project from its outer or lower surface and define cam surfaces 26 and 27.

At the end of housing 11 remote from bracket 12 and projecting downwardly from opposite side edges thereof are two ears 30 between which are mounted three blocks of insulating material 31, 32, and 33. The three blocks are held between the outer surface of housing wall 13 and a metal plate 34 by rivets 35. Clamped between blocks 31 and 32 are the ends of two contact blades 36 and 37. The free ends of contact blades 36 and 37 have noses 38 and 39 which ride against cam surfaces 26 and 27 respectively being held in engagement with the cam surfaces and cause to follow the cams by their inherent resiliency. Contact blades 36 and 37, in the present instance, are formed integral with each other at their fixed ends and are provided with a common terminal ear 40 to which an electric wire may be connected. Clamped between blocks 32 and 33 are two follower contact blades 41 and 42 which adjacent to their free ends are provided with contact buttons 43 and 44 respectively adapted to make contact with contact buttons 45 and 46 on contact blades 36 and 37 and being biased in engagement therewith by the inherent resiliency of blades 41 and 42. At their anchored ends blades 41 and 42 are provided with terminal ears 47 and 48 to which electric wires may be connected. Adjustably mounted in openings in follower blades 41 and 42 at their free ends are screws 49 and 50 having caps 51 and 52 of suitable insulating material fixed on their upper ends. The adjusting screws with the caps on their ends project up through openings 53 in contact blades 36 and 37 and in housing bottom wall 13 to positions where the ends of the caps may be engaged by bimetal 17. Fixed at one edge of cam plate 21 is an operating handle 54 for use in turning the cam plate with respect to noses 38 and 39. The cams through the intermediary of contact blades 36 and 37 serve to position the pairs of contacts 43, 45 and 44, 46 and pins 49 and 50 with respect to bimetal 17. In the diagram in Fig. 6, for example, the adjustment of the cam plate is such that cap 51 on follower blade 41 is almost but not quite in engagement with the bimetal and cap 52 on follower blade 42 is spaced from the bimetal; and the bimetal is in a position which it occupies at a certain lower temperature, for example, room temperature. With increase in temperature the bimetal will deflect downward, first at a certain higher temperature engaging cap 51 and moving follower arm 41 to separate contacts 43, 45 and then at a certain still higher temperature engaging cap 52 to move follower arm 42 to separate contacts 44, 46. When the cam plate is turned on its pivot 22 the cams 24 and 25 are both turned to move simultaneously contact blades 36 and 37 and thus adjust the positions of the pairs of contacts 43, 45 and 44, 46 and their caps 51 and 52 with respect to bimetal 17 and so change the temperatures at which the contacts will be separated by deflection of the bimetal. The desired initial positions of caps 51 and 52 with respect to bimetal 17 may be adjusted by means of the screws 49 and 50 in an obvious manner.

Our thermostat is well adapted for use in an automatic electric coffee percolator wherein there are provided a preheat or booster heating unit and a pump heating unit, and preferably also a keep warm heating unit, the perheat unit being arranged to impart heat to the main body of water in the percolator to bring or assist in bringing the water up to a desired initial temperature; the pump unit being associated directly with the pump well for heating water in the well to form steam for forcing water from the well up through the fountain tube to the ground coffee containing basket; and the keep-warm unit being arranged for maintaining the brew at a suitable drinking temperature after the brew has been made; the preheat unit being used also for reheating the coffee in case the percolator has been disconnected and the coffee has cooled. In such a coffee percolator the strength of the brew may be varied by varying the temperatures of the water at which the circuits through the preheat heating unit and the pump heating unit are opened. By our invention these temperatures may be adjusted simultaneously over a given range and always in the same relations to each other, by shaping the two cams with respect to each other. In the embodiment illustrated the cams are arranged to effect adjustment of these temperatures inversely relative to each other.

In Fig. 1 the thermostat is shown as being attached to the bottom wall 60 of a coffee percolator by bolts 61 which extend through the openings 16 in ears 15 and openings in wall 60. The bimetal is directly adjacent to bottom wall 60 and being enclosed in housing 11 is subjected primarly to the temperature of the water in contact with wall 60.

The percolator shown in Fig. 1 includes water container 62 having a handle 63 and a pouring spout 64. The container rests on a base 65 which with bottom wall 60 forms a housing for the thermostat and the heating units, the base in turn being supported on a sub-base 66 of suitable heat-resistant insulating material. Bottom wall 60 is shaped to provide a depending heating well 67 in the bottom wall of which is fastened a pump well 68. The fountain tube is indicated at 69, it having a domed shaped head 70 which rests on the rim of well 68, the ground coffee basket is indicated at 71 and the water spreader for the basket at 72. The operation of a coffee percolator of this type is well known and requires no explanation.

Surrounding heating well 67 is a suitable structure comprising a preheat or booster heating unit 73 and a keep-warm heating unit 74 and surrounding pump well 68 is a pump heating unit 75. These heating units are wired to the thermostat as shown in the diagrammatic view, Fig. 6, preheat unit 73 being connected to the source of electricity represented by lines 76 in series with contacts 44, 46; pump unit 75 being connected to the source in series with contacts 43, 45; and keep-warm unit 74 being connected directly to the source in series with pump unit 75, it being thus short circuited by contacts 43, 45 when they are closed. In series with keep-warm unit 74 is an indicator lamp 77. On a finishing plate 78 surrounding the opening in base 65 through which handle 54 projects are suitable indicia for indicating settings for the cam plate. These are indicated at A, B, C and D in Figs. 5 and 6 and are labeled "Reheat," "Mild," "Medium" and "Strong," respectively. By positioning the cam plate in accordance with the setting indicated, the pairs of contacts 43, 45 and 44, 46 and the blades carrying them are adjusted with respect to bimetal 17 to thereby adjust the temperatures at which the respective pairs of contacts will be separated and hence the periods during which preheat unit 73 and pump unit 75 will be energized. The cams may have various shapes as desired. Referring to Fig. 6 it will be seen that with the cam plate set at position C, for example, the ends of caps 51 and 52 will be positioned with respect to bimetal 17 so that contacts 44, 46 will be opened at one water temperature to open the circuit through preheat unit 73 and contacts 43, 45 will be opened at another and higher water temperature to open the circuit through pump unit 75, the ends of the caps occupying the positions indicated by the lines c. If the cam plate is moved from the C position to the D position the end of cap 52 will be set closer to bimetal 17 and the end of cap 51 will be set farther away from the bimetal. This means that contacts 44, 46 will be separated at a lower water temperature to open the circuit through preheat unit 73 than for position C and that the contacts 43, 45 will be separated at a higher temperature to open the circuit through pump unit 74 than for position C, a thing which results in a longer period of percolation and hence a stronger brew. In other words the period during which both heating units are in circuit is shortened. On the other hand, if cam plate 21 is moved from the C position to the B position the end of cap 52 will be set farther from bimetal 17 and the end of cap 51 will be set closer to the bimetal. As a result contacts 44, 46 will be separated at a higher water temperature and contacts 43, 45 will be separated at a lower water temperature than before which will result in a shorter period of percolation. In other words the period during which both heating units are in circuit will be lengthened, thus increasing the time during which both units are imparting heat to the water in the container. Starting at cam plate setting B movement of the cam plate toward setting D results in a gradual adjustment of the ends of caps 52 and 51 with respect to the bimetal to gradually decrease the water temperature at which contacts 44, 46 are separated and increase the water temperature at which contacts 43, 45 are separated, thus gradually increasing the length of the percolating period and hence the strength of the brew. This is illustrated in Fig. 2 where brew temperatures have been plotted against time, the curves showing increase in water temperature with time and the ends of the curves indicating the point at which both sets of thermostat contacts are open. For the curve marked "mild" the two sets of contacts open at about the same temperature indicated by the end of the curve which corresponds to a temperature of about 180° and a brew period of about 8 minutes. For the curve marked "medium" contacts 44, 46 are separated at a lower water temperature indicated by point P on the curve, approximately 150°, and the contacts 43, 45 are separated at the higher temperature corresponding to the end of the curve, approximately 185° and a brew period of about 11½ minutes. For the curve marked "strong" the contacts 44, 46 are separated at a still lower water temperature indicated by point P' on the curve, approximately 140°, and the contacts 43, 45 are separated at a still higher temperature corresponding to the end of the curve, approximately 195° and a brew period of about 15 minutes. A consideration of the graph indicates that by decreasing the water temperature at which the circuit through the preheat unit is opened a desired increase in the length of the percolation period is obtained without having to increase too much the water temperature at which the pump unit circuit is opened. The idea of varying the temperature at which the preheat unit is deenergized to vary the strength of the brew is not our invention but is described and claimed in the copending application of Earle C. Sullivan, Serial No. 425,287 (6D386), filed April 23, 1954, and assigned to the assignee of the present application. Our invention is directed to the idea of simultaneously varying the temperature at which both the preheat unit and the pump units are deenergized, particularly in an inverse relationship, and to the structure of the adjustable thermostat employed.

When pump unit contacts 43, 45 are opened the shunt around the keep-warm unit 74 is opened thus putting the keep-warm unit across the line in series with pump unit 75 to keep the brew at a suitable drinking temperature. In this connection it is pointed out that pump unit 75 has a resistance substantially lower and a wattage substantially higher than those of the keep-warm unit so that when connected in series most of the heat will be generated in the keep-warm unit. For example, the pump unit (and also the preheat unit) may have a wattage of the order of 400 watts and a resistance of the order of 33 ohms and the keep-warm unit may have a wattage of the order of 30 watts and a resistance of the order of 325 ohms.

When the cam plate is in the reheat position, the position shown in Figs. 5 and 6, cap 52 is at a maximum distance from bimetal 17 while cap 51 is approximately in contact therewith by reason of the low spot at the end of cam 24 in which nose 38 is located. As a result contacts 43, 45 will be opened at a low temperature, a temperature at or slightly above normal room temperature, which means that the reheating will be effected primarily by the preheat unit 73 but assisted somewhat by the keep-warm unit. This operation is illustrated by the curve marked "reheat" in Fig. 2. When the brew temperature for which cap 52 is adjusted has been reached, the bimetal will separate contacts 44, 46. The keep-warm unit 74 will then function to keep the brew at the desired drinking temperature.

By our invention we provide a compact thermostat structure which can be easily assembled and readily adjusted initially and which can be attached to a vessel, such as a coffee percolator, as a unit. By reason of the cam plate with the plurality of cams thereon, a separate cam for each set of contacts, the structure is unusually versatile and can be modified to meet various operating conditions.

What we claim as new and desire to secure by Letters Patent of the United States is:

1. The combination, a base comprising a thermostat housing and a bracket adapted to be attached to an electrically heated receptacle, a thermostat member mounted in the housing, a cam mounted on said bracket and having two adjacent cam surfaces, two contact blades each attached at one end to said base, the other ends of said blades projecting to positions adjacent said cam with said other end of one contact blade in engagement with one of said cam surfaces and said other end of the other contact blade in engagement with the other of said cam surfaces, a follower blade associated with each contact blade, each follower blade having a contact biased into engagement with the contact of its corresponding contact blade, said thermostat member being mounted for deflection to effect movement of said follower blades to effect separation of said contacts, and means on said cam for moving said cam relatively to said other ends of said contact blades for adjusting the position of said contact blades and said follower blades as a unit with respect to said thermostat member.

2. The combination, a base comprising a thermostat housing and a bracket adapted to be attached to an electrically heated receptacle, a bimetal thermostat member mounted in the housing, a cam pivotally mounted on the underside of said bracket having two adjacent arcuate cam surfaces, two contact blades attached at their one ends to the underside of said base, their other ends projecting to positions beneath said cam with the end of one contact blade in engagement with one of said cam surfaces and the end of the other contact blade in engagement with the other cam surface, said ends being biased into engagement with said cam surfaces, contacts on said contact blades, a follower blade beneath each contact blade each having a contact thereon biased into engagement with said first-named contacts, pins connected to said follower blades which project to positions beneath said thermostat member where they are adapted to be engaged by the thermostat member for effecting separation of said contacts, and an arm on the cam for moving the cam relatively to the ends of said contact blades for adjusting the positions of said contact blades, follower blades and pins as a unit with respect to said thermostat member.

3. The combination, a base, a thermostat member carried by the base, a plurality of pairs of spring contact blades attached to the base, each pair having contacts adapted to be separated by movement of one blade of the pair with respect to the other, said thermostat member being mounted for deflection to effect movement of one blade of each pair for separating the contacts, a cam plate mounted on the base, and cams on the cam plate, each pair of spring contact blades being operatively associated with one of said cams for adjusting the position of one of said blades of each pair with respect to said thermostat member to vary the temperatures at which the respective pairs of contacts will be separated by said thermostat member.

4. The combination, a base, a bimetal thermostat member carried by the base, a plurality of pairs of spring contact blades attached to the base, each pair having contacts adapted to be separated by movement of one blade of the pair with respect to the other, a cap carried by each pair of contact blades adapted to be engaged by the thermostat member for separating the contacts, a cam plate pivotally mounted on the base, and cams on the cam plate, each pair of spring contact blades being operatively associated with one of said cams for adjusting the positions of the caps with respect to the bimetal thermostat member to vary the temperatures at which the respective pairs of contacts will be separated by the bimetal thermostat member.

5. A unitary thermostat structure for use with an electrically heated vessel having two electric heating units, for controlling circuits for the heating units comprising a base having walls which define a housing, bimetal thermostat means in the housing, means for attaching the base to a vessel wall with the bimetal thermostat means directly adjacent to such wall, a cam plate mounted on the base for movement relatively to the base, walls forming two cam surfaces on the cam plate, two pairs of contact blades attached to the base, one for each heating unit, normally closed contacts on the blades adapted to be separated by movement of one blade of a pair relatively to the other, actuating means carried by each pair of blades adapted to be engaged by the bimetal thermostat means for effecting separation of the contacts, and means forming parts of said pairs of contact blades which engage respectively with said cam surfaces for simultaneously adjusting said actuating means and contacts relatively to said bimetal thermostat means for varying separately the temperatures at which it effects separation of said pairs of contacts.

6. The combination defined by claim 5 wherein said cam surfaces are contoured to effect adjustments of said actuating means and contacts relatively to said bimetal thermostat means inversely relative to each other.

7. The combination with an electric coffee percolator having a preheat heating unit and a pump heating unit of a unitary thermostat structure for controlling heating circuits for said units comprising a base, thermostat means carried by the base, a cam plate mounted on the base for movement relatively thereto having walls forming two cam surfaces having different contours, two pairs of contact blades carried by the base, one pair for each heating unit, normally closed contacts on the blades adapted to be separated by movement of one blade of a pair relatively to the other, actuating means carried by each pair of blades adapted to be engaged by the thermostat means for effecting separation of the contacts, and means forming parts of said pairs of contact blades which engage respectively said cam surfaces for simultaneously adjusting said actuating means and contacts relatively to said thermostat means for varying separately the temperatures at which it effects separation of said pairs of contacts whereby the temperatures at which the circuits of the respective heating units are opened by the bimetal thermostat means may be correlated with respect to each other by changes in the contours of said cam surfaces.

8. The combination defined by claim 7 wherein said cam surfaces are so contoured that in one position of the cam plate only the circuit for the preheat unit will be closed.

9. The combination defined by claim 7 wherein said cam surfaces are contoured to effect adjustment of said actuating means and contacts relatively to said bimetal thermostat means inversely relative to each other.

References Cited in the file of this patent

UNITED STATES PATENTS

| | | |
|---|---|---|
| 1,709,681 | Mottlau | Apr. 16, 1929 |
| 1,853,325 | Stewart | Apr. 12, 1932 |
| 2,267,387 | Winborne | Dec. 23, 1941 |
| 2,657,300 | Sullivan | Oct. 27, 1953 |